Patented Feb. 22, 1944

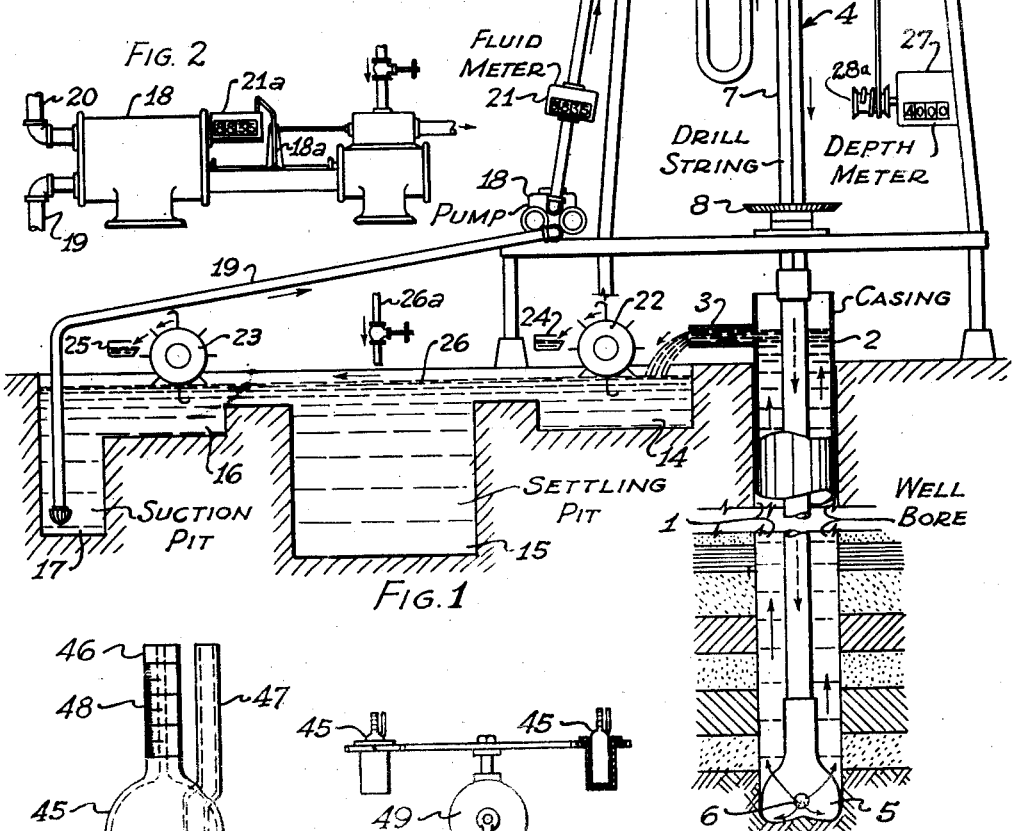

2,342,273

UNITED STATES PATENT OFFICE 2,343,273

METHOD FOR DETECTING OIL IN WELL DRILLING

John T. Hayward, Tulsa, Okla.

Application August 19, 1940, Serial No. 353,201

6 Claims. (Cl. 73—51)

This invention relates to a method for the detection of crude petroleum oils, whereby the oil-bearing formations from which said oil came are located, during the drilling of wells by the rotary method wherein a stream of mud-laden drilling fluid is circulated through the well during the drilling operation.

This invention is a continuation-in-part of applicant's co-pending application Serial No. 282,473, filed July 1, 1939, and Serial No. 187,619, filed January 29, 1938, as to common subject matter.

In accordance with conventional rotary drilling practice, particularly as practiced in the method embodying this invention, a mud laden drilling fluid, consisting generally of a suspension of clay solids in water, is circulated through the well during the drilling thereof for the purpose of washing the drill cuttings from the well, plastering the wall of the bore hole, keeping the bit clean, etc. The hydrostatic head of the drilling fluid column is maintained substantially in excess of the pressures of any of the cognate fluids, such as oil, gas and water, contained in any of the formations traversed by the drill. Ordinarily, the specific gravity of the drilling fluid is so controlled to secure such head by the solid clay phase of the drilling fluid, but where necessary by adding high specific gravity weighting materials thereto, such as barytes, iron oxide, etc. Also, a gel-component, such as a colloidal clay like bentonite, is sometimes added to the mud fluid to maintain the solid components of the mud fluid, that is, the clay and weighting materials, in more or less permanent suspension, and to aid in quickly sealing up and plastering the formations traversed by the drill. The resulting drilling fluid is generally a comparatively viscous fluid of about the consistency of heavy lubricating oil. As a result of the excess head of the column of drilling fluid and of its wall sealing and plastering properties, when a fluid-bearing formation, such as an oil-bearing stratum, is pierced by the drill, the excess head of the drilling fluid column and its sealing properties will act promptly to prevent the inflow of the oil, into the well bore and into the column of mud fluid, and to effectively seal up such stratum. In fact, in modern rotary drilling practice, great care is exercised in carefully controlling the properties of the mud fluid so that no such inflows will occur, since, otherwise, there is great danger that the high pressure cognate fluids will enter the well bore in sufficient quantities to cause disastrous "blow-outs," with consequent great hazard to the well and to life and property in the vicinity of the well.

Under the described conditions of modern rotary drilling practice wherein the inflow of petroleum oil from the traversed formations is prevented, and where the flow upwardly in the well is at a rate which is large compared to the rate of penetration of the stratum being drilled, applicant has found, contrary to general belief, that certain exceedingly minute amounts of the oil will indeed be present in the circulating drilling fluid and can be detected in the mud fluid, and the location of the strata responsible therefor can be determined by methods forming the subject matter of this invention and disclosed originally in the aforementioned co-pending applications.

Applicant has discovered that under modern rotary drilling conditions, such as described above, while the inflow of oil from a stratum traversed by the drill, will be effectively prevented, nevertheless, the very small quantity of the oil, probably normally contained in the comparatively small core or cylinder of the stratum drilled out by the bit, as distinguished from the fluids in the surrounding strata, will become dilutedly dispersed by the action of the drill bit in the upwardly rising column of drilling fluid and may, by suitable methods of analysis, be detected in the drilling fluid returns at the top of the well. Applicant has also found, that during the drilling in the manner described, the successive portions of the core drilled from a strata, and their respective oil contents, are dispersed in successive increments of the drilling fluid column rising in the well, and although dispersed therein in exceedingly dilute proportions, the dispersed oil contents will retain their respective positions in the respective increments of the drilling fluid into which they were dispersed. In accordance, therefore, with this invention, a novel and useful method and apparatus has been devised whereby successive increments of the drilling fluid returns at the top of the well may be analyzed to determine the presence of oil in such successive increments. Furthermore the movement of each increment of the drilling fluid may be traced in its passage through the well, and by suitable correlation with the depth of the stratum, measured in synchronism with the rise of the increments of the drilling fluid from that stratum, one is enabled to determine the arrival at the top of the well of each increment of the drilling fluid with its dispersed fluid contents from the respective portion of the drilled core, and to then analyze that increment and identify the resulting analysis with the stratum responsible therefor.

Generally stated and in accordance with the illustrative embodiment of this invention, in the drilling of an oil or gas well by the employment of a circulating drilling fluid, successive portions of the core drilled from a stratum and their respective oil contents are dispersed in successive increments of the drilling fluid column rising in the well. Since, however, the oil contents dispersed in the drilling fluid are probably those from the core or cylinder within the well bore, as distinguished from fluid flowing into the well from the strata surrounding the core, the dispersion of the oil will be exceedingly dilute and can be observed and analyzed only by delicate instruments. By making analyses of successive increments, it can be determined whether any oil-show persists and whether the oil stratum is minor or extensive. Means may be also provided for ascertaining not only the presence, but the volume of oil carried by the drilling mud. One method for determining the presence and also the volume of oil, is carried out by subjecting the drilling fluid return to an action, such as centrifugal force, causing modification of the status of the occluded oil. The drilling fluid may also be treated with a chemically-acting viscosity-reducing agent to facilitate the analysis for oil. The location of the formation from which the indication of oil entered the mud may be ascertained by determining the rate at which the circulating of the mud occurred, as by considering the rate of pumpage of the mud, the rate of penetration of the bit and by measurement of the depth of the formation from which the mud acquired the indications observed. In order to identify an increment, containing core fluid dispersed therein, at the top of the well as related to the depth of the stratum from which the core portion contained in that increment was taken, the depth of the stratum is measured in synchronism with the rise of that increment from that stratum. This can be accomplished even though the increment tested arrives at the top of the well after the depth of the drill may be greater than when that increment left or passed that stratum. Accordingly the measurement of the depth of the stratum can be said to be in synchronism with the rise of the later analyzed increment from that stratum, even though there may be a time or a space relation between the two. An increment to be analyzed having reached the top of the well, an analysis of the fluid dilutedly dispersed therein can not only be accomplished by delicate instruments, but such analysis is related to the depth of the stratum from which the core tested was taken.

In accordance with this invention, use is made of the fact that the flow of the hydraulic fluid through the well is in the form of a closely restricted stream, the incoming fluid being confined within the bore of a drilling string, while the outgoing drilling fluid is confined within the annular space between the wall of the well bore and the outside of the drilling string. In this restricted stream flow of the hydraulic fluid, the applicant has discovered that very little lineal mixing of the oil occurs in the stream. That is, while the drill string may be rotating at fairly high speed in contact with the drilling fluid moving upwardly on the outside of the drilling string, very little mixing of lineally spaced increments of the fluid stream will occur.

For example, if we assume a particular increment of the stream of fluid as being 10 feet in advance of another increment, these two increments will remain substantially the same distance apart throughout their flow from the entrance to the exit of the well. It is also found that the agitation of the drill bit, when fluid flows through the cutting or drilling zone, will act merely to agitate each increment as it flows past the bit but will not cause appreciable mixing of one increment with the next, or expressed differently, agitation of the stream of fluid will not be reflected through any appreciable length of the stream of fluid.

Since, therefore, the only changes in the character and composition of any increment of the drilling fluid, are those which will occur in the immediate vicinity of the drill bit and are those produced by introduction into the fluid of the cuttings and oil contained therein, which are removed by the drill bit from the stratum being drilled at the moment the particular increment passes through the cutting zone, then, by tracing the selected increment through the well, or in its rise from that stratum to the top of the well, and by then analyzing the outgoing increment, the nature of the stratum can be determined and its location in the well can be properly logged. As stated, in the case of oil, where the property or characteristic of the mud is initially known, an analysis for oil in the outgoing mud may be made, generally, without comparing the increment leaving the well with that entering the well.

Since, as noted, each increment of the circulating fluid retains its substantial identity and its same relative position in the stream of drilling fluid throughout its passage through the well, and since the size of the drill string and well bore are known, as well as the depth of the well at all times, which is measured by any one of several ways to be described in greater detail hereinafter, the volume of drilling fluid inside and outside the drilling string can be calculated. Knowing the area and the length of the restricted path of flow of the stream of fluid, the volume of fluid per unit length of the stream may be determined, and by measuring the volume of fluid flowing into or from the well, the position of each increment, at every point in its flow through the well, may be readily determined, and each increment may thus be traced from the time it enters the well until it leaves the well. As indicated above, in testing for oil in the drilling mud returns at the top of the well, where the initial property or character of the entering mud is known, no comparison of the nature of the incoming and outgoing increment is necessary and only the outgoing increment is tested for the presence of oil, the rise of the increment being traced more directly from the stratum at the bottom of the well to the top.

The correlation of an increment of fluid leaving a well with the depth of the well and also with the same increment entering the well, can be effected by measuring the volumetric flow of fluid through the well. The volumetric flow is measured directly, by suitable metering devices, and is measured without relation to any time element or rate of flow, and the relationship utilized, is one of units of volume of fluid relative to lineal footage of well depth. By way of example, let us assume that a well is drilling at a depth of 4,000 feet, the diameter of the well bore is nine inches, the internal diameter of the hollow drill pipe is three inches and its external diameter three and one-half inches. The length of the drill pipe will be, of course, 4,000 feet. The volume of fluid inside the drilling string from the top of the well to the drill bit at the bottom will be approximately 35 barrels, and the volume of fluid in the annular space between the drill pipe and the well bore will be approximately 265 barrels. From these figures, it will be seen that an increment of fluid entering the drill pipe must traverse a distance, represented by the flow of 35 barrels of fluid from the well, to reach the drill bit at the bottom of the well, and in flowing from the bottom of the well back to the top thereof, through the annular space between the drill pipe and the well bore, the increment must travel a distance measured by a flow of 265 additional barrels of fluid, or, each increment entering the well will re-emerge therefrom 300 barrels later. Thus, by testing the fluid entering the well, and after 300 barrels of fluid have thereafter flowed from the well, testing the emerging fluid, the tests thus obtained will represent the oil-containing properties of substantially the same increment, and any changes in the outgoing fluid compared with the entering fluid, will be changes effected by material drilled from the formation encountered at the bottom of the well, and these changes are utilized for logging the formation encountered by the drill at 4,000 feet.

In those cases where direct comparison of the properties of the outgoing increment with those of the increment entering the well is unnecessary, the depth of the stratum to which the outgoing increment is related may be found by subtracting 265 barrels from the reading of the meter, and reading the depth corresponding to that reduced reading, namely, 4,000 feet, in the example given. This procedure will be more fully described hereinafter.

It should be noted that great accuracy in measuring the circulating drilling fluid is not necessary. Under average conditions, about 100 barrels or more of fluid are circulated per foot drilled and the rate of upward flow of the drilling fluid in the well will be large as compared to the rate of penetration of the drill. In the 4,000 foot well of the foregoing example, a plus or minus error of 10 percent in the measurement of the fluid would only mean an error of plus or minus about one inch in logging the formation at 4,000 feet. In practice, however, the accuracy of determining the well depth, at which oil is encountered, is high by the method embodying this invention.

As the well becomes deeper, the volume of drilling fluid in the circulating system in the well increases directly in proportion to the increase in the depth of the well, and the same proportionate increase applies both to the fluid inside the drilling string and that outside the drilling string. By applying the proper corresponding corrections, in terms of barrels of fluid, to the spacing of the tests, the relative identity of the increments tested can be maintained.

Various tests suitable for identifying the nature of the strata may be utilized and this invention is directed particularly to those for the detection of oil and the location therefrom of the oil-bearing strata.

As pointed out above, the quantity of oil to be detected is that very small quantity probably contained in the cylindrical core which is cut by the drill bit and dispersed in the drilling fluid. This small quantity of oil will become widely dispersed in the drilling fluid in the form of relatively minute globules or as thin films on the surfaces of the minute particles of solid matter contained in the drilling fluid. The dispersion will be very dilute since as much as 100 barrels or more of drilling fluid will be circulated for each lineal foot of stratum drilled. Even in the case of a very rich oil stratum, the quantity of oil thus dispersed in the drilling fluid will be of the order of one part in 20,000 or less. Since, as explained above, the drilling fluid is generally a comparatively viscous clay slurry containing a gel-component, these minute globules or particles of oil will become tightly occluded in the drilling fluid and are thereby rendered substantially completely invisible and unobservable directly to the unaided eye and the other senses, and ordinarily will not separate readily from the drilling fluid. It is important, therefore, that a suitable method and means be provided whereby the presence of such minute amounts of oil may be promptly detected in the drilling mud return in order that the driller may be promptly informed that the drill has entered an oil-bearing formation and be enabled to promptly determine the location of such oil-bearing formation.

In accordance with an illustrative embodiment of this invention, therefore, methods and apparatus are provided for detecting the presence of crude petroleum oil in the strata of an oil well while being drilled by the employment of a circulating comparatively viscous mud fluid, while the drilling fluid is caused to flow upwardly in the well at a rate which is large compared to the rate of penetration of the oil stratum being drilled, and while the fluid column is maintained at a head exceeding the head of the stratum being drilled. Moreover, by measuring the depth of the well in synchronism with the rise of a selected increment from the oil bearing stratum at the bottom of the well to the top of the well, and analyzing the selected increment at the top of the well for oil, the presence of oil in such increment can be related to the stratum from which it came and the location of the oil-bearing stratum thereby determined. Various methods directed particularly to the detection of the presence of crude petroleum oil in drilling mud, during drilling under the conditions described above, will be described hereinafter in conjunction with steps for locating the oil-bearing formations.

The various objects and advantages of this novel invention will be more readily understood from the following detailed description when read in conjunction with the accompanying drawing which illustrates, more or less diagrammatically, apparatus suitable for practicing the method of this invention. It will be understood, however, that this invention is not limited to any particular apparatus or even details of steps, but that various changes may be made in details, within the scope of the appended claims, without departing from the spirit of this invention.

In the drawing:

Fig. 1 illustrates more or less diagrammatically the drilling mud circulation system of a well illustrating an embodiment of this invention.

Fig. 2 is a detail of a mud circulating pump adapted to function as a mud meter.

Fig. 3 illustrates a form of apparatus for detecting oil in the drilling mud in accordance with one embodiment of this invention.

Figs. 4 and 5 illustrate details of another form of oil detection apparatus in accordance with another embodiment of this invention.

Referring to the drawings and Fig. 1 in particular, the numeral 1 designates a well bore being drilled in accordance with modern conventional rotary drilling methods, by the employment of a circulating hydraulic fluid, such as a suspension of clay solids in water, generally of the composition as above described, and conventionally termed "rotary mud" or drilling fluid or mud-laden fluid. The upper portion of well bore 1 is lined with a casing 2, generally termed the surface casing, which usually extends only a comparatively short distance into the well. The upper end of casing 2 is provided with a side outlet pipe 3. Extending into the well through casing 2 and well bore 1 is a conventional hollow drilling string, designated generally by the numeral 4, to the lower end of which is connected a drill bit 5 provided with openings 6, commonly termed "eyes," adjacent the cutting teeth of the bit. A Kelly joint 7 is connected to the upper end of the drill pipe and extends through a rotary table 8 mounted conventionally on the floor of derrick 9. Rotation of rotary table 8 engages the squared surfaces of kelly 7 and thereby rotates the drill string in the usual manner to cause the bit 5 to cut through the formation. The upper end of kelly 7 is connected to the usual rotary hose swivel 11 and the entire drilling string is suspended in the usual manner from a traveling block 12 which is adapted to be raised and lowered in the derrick by means of cables 13, all in accordance with common practice.

The mud circulating system comprises the usual mud ditch 14, settling pit 15, overflow ditch 16, pump suction pit 17, a mud pump 18 having a suction pipe 19 leading into suction pit 17 and having a mud discharge conduit 20 which communicates with the bore of the hollow drill string 4 through swivel 11. A fluid meter 21 is positioned in conduit 20 and is adapted to measure the volumetric flow of the mud fluid flowing through conduit 20. Fluid meter 21 may be of any conventional type adapted to measure the units of drilling fluid passing through the well. In practice, the applicant has found that the ordinary reciprocating pump, as illustrated by pump 18, when operated against a constant discharge pressure is sufficiently accurate, volumetrically, to function as a mud meter. The pump may be so used by connecting a suitable counter to the rocker arm of the pump for counting the stroke cycles of the pump. Since the displacement of the pump is known or can be readily calculated, the stroke cycles can be readily converted to barrels or other suitable units for measuring the flow of mud through the well. An apparatus arrangement suitable for this purpose is illustratively shown in Fig. 2 wherein pump 18 is provided with the usual rocker arm 18a to which is connected any suitable form of pump stroke counter 21a which may be calibrated in accordance with the pump displacement to read in any desired units, such as barrels of mud.

Mud samplers 22 and 23, diagrammatically illustrated in the drawing, but of any suitable or conventional type adapted to take average samples of the flowing stream of mud, are mounted in mud sampling relation to the fluids in mud ditch 14 and overflow ditch 16, respectively, and are provided with sample receivers 24 and 25, respectively. It will be understood that various other means for sampling the fluids may be used. The mud fluid in circulation in the system is designated generally by numeral 26. A valved pipe 26a is positioned adjacent to the mud ditch for supplying water and mud conditioning materials as may be required for controlling the character of the mud in accordance with conventional practice.

The depth of the well may be measured at all times by any conventional method and this is commonly done by adding together the measurements of the lengths of all joints of drill pipe in the well, and by suitably marking the kelly to determine how much of its length has descended into the well. However, the depth measurements may be conveniently obtained by suitable mechanical or automatic measuring devices such as that described in applicant's Patent 2,166,212, dated July 18, 1939. A suitable mechanical depth measuring device is diagrammatically represented in the drawing by a depth meter 27 operated by means of a measuring line 28 passing over a measuring pulley 28a and leading over pulleys 29 and 30 to the traveling block 12, the measurement of the depth of the well or length of drill pipe in the well being obtained thereby from the downward movements of the traveling block as it follows the downward movement of the drilling string in the well.

In tracing an increment of the drilling fluid through the well the operation is conducted in the following manner: Assume, as in the above example, that the well is 4,000 feet deep, the well and pipe dimensions are as given above, and the calculated volumes of the interior of the drill string and of the annular space between the drill string and well bore are 35 barrels and 265 barrels, respectively. The operator starts by reading fluid meter 21 which now shows 8,800 units (barrels). When the meter reads 8,835 the increment entering the well at the reading of 8,800 will have reached the bottom. He now measures the depth of the well on depth meter 27, and this reading is 4,000 feet, which is the depth of the stratum at the bottom of the well through which the bit is currently cutting when the selected increment reaches the bottom of the well. When the fluid meter reading has advanced to 9,100, that is, an additional 265 units (barrels) has passed through the well, the operator knows that that particular increment which entered the well at a fluid meter reading of 8,800, and which was at the bottom of the well at a depth of 4,000 feet at a fluid meter reading of 8,835, has just emerged from the well through overflow pipe 3, and will contain the fluid contents of that portion of the core from the stratum at 4,000 feet which was dispersed in the drilling fluid by the action of the drill bit. The operator now takes a sample, as by means of sampler 22, of the fluid emerging from the well at the fluid meter reading of 9,100, and by suitable analysis thereof, in a manner to be described hereinafter, he will test for the presence of oil in that increment, and if oil is found, he will know that the oil came from the stratum at 4,000 feet. Obviously, during the time the increment is rising from the stratum at 4,000 feet, the drill will have progressed some distance beyond this depth, but this is no longer material in connection with the particular increment being traced, since its relationship to the depth from which it came has already been fixed. By continuously taking similar sets of readings throughout the drilling operation, the operator will know with what depth each increment of the return drilling fluid is identified, and can thereby relate each test upon an outgoing increment to the stratum which it represents.

The following table is illustrative of the manner in which the readings are taken and tabulated:

| Meter reading (1) mud in | Meter reading (2) depth mud at bottom | | Meter reading (3) mud out |
|---|---|---|---|
| 8,800 | 8,835 | 4,000 | 9,100 |
| 8,900 | 8,935 | 4,001 | 9,200 |
| 9,000 | 9,035 | 4,002 | 9,300 |

When testing for oil, the operator usually knows the condition of the entering mud and, therefore, does not need to take a sample of the entering increment for comparison. He merely takes a sample of the outgoing mud; reads the fluid meter; for example, at 9,300; subtracts 265 from it, getting the resulting reading of 9,035; looks at his table and notes that at 9,035, which was the meter reading when the sample left the bottom of the well, the depth was 4,002 feet. He knows that the outgoing sample which he took contains the contents of the core drilled from a depth of 4,002 feet.

In cases where it is necessary or desirable to directly compare the properties of an increment leaving the well with its properties when entering the well, the operator takes a sample of the entering fluid, as by means of sampler 23, and reads the fluid meter at 8,800, then takes an outgoing sample with sampler 22 at a meter reading of 9,100 and will know that this outgoing sample is from the same increment as that previously sampled. By comparing the properties of the two samples, if any difference in properties appears, he will know that the difference was produced by the dispersed core portion coming from 4,000 feet.

As will be evident from the foregoing description of the manner in which each increment of the drilling fluid is related to the stratum from which the drilled core and its contents were dispersed into that increment, the measurement of the depth of the well is made in synchronism with the rise of the selected increment from the stratum at the bottom of the well to the top of the well, since, by the time the selected increment is at the top of the well, the drill will have progressed some distance beyond the stratum to which the core contents of that increment is related. Since, as noted previously, about 100 barrels of drilling fluid is ordinarily circulated through the well per lineal foot of core drilled, the rate of circulation is large compared with the rate of penetration of the drill, and this is found to be conducive to great accuracy in the method of this invention in locating the various strata, since one foot of core will be dispersed in the long column of fluid represented by a volume of 100 barrels, and an inaccuracy of even 10% in measuring the volume of fluid will produce a maximum error of only slightly more than one inch in relating the outgoing increments of the mud fluid to their corresponding strata.

In testing or analyzing the drilling mud returns for the presence of oil, several methods may be employed. One method described in applicant's Patent No. 2,213,138, granted August 27, 1940, comprises subjecting the drilling mud returns to a fluorescence-exciting ray, whereby the minute and normal invisible amounts of crude petroleum oil introduced into an increment of the mud fluid passing an oil bearing stratum, while the drill was cutting through that stratum, are rendered visible by fluorescence. By modifications of this method, as described in said Patent No. 2,213,138, this method may be employed to distinguish between the natural crude petroleum oil coming from the drilled core of the oil bearing stratum and any extraneous oils and greases, such as tool-joint or wire line greases, when both the natural and extraneous materials are or may be present in the mud at the same time. Other modifications may be provided by means of which the high viscosity of the mud sample being tested may be broken down by means of water or chemically-acting viscosity reducing agents to allow the minute particles of oil occluded in the mud to rise to the surface of the sample where they may be subjected to the inspection rays and whereby any emulsions, which may be formed from the violent agitation of the oil particles with the aqueous vehicle of the mud by the action of the drill may be broken to free the oil. Among the various treating agents generally useful for this purpose, are chemically acting viscosity reducing agents such as weak organic acids, such as gallic, humic and tannic acids, sodium hexa-metaphosphate, sodium tetra-pyrophosphate, sodium tetra-phosphate, di-sodium phosphate, sodium hydroxide and others and mixtures of these substances. Calcium oleate, sodium hydroxide, sodium carbonate and other chemicals are useful for breaking down various emulsions.

Referring to Fig. 3, the apparatus shown (of Patent No. 2,213,138) includes a housing 31, which may be either a daylight excluding box in which the detection apparatus is housed, or may represent the walls of a dark room in which both the apparatus and the observer may be stationed and from which extraneous light may be excluded. A shallow container 32 is positioned within housing 31 and is adapted to contain a sample of well drilling mud 33 to be examined for the presence of crude petroleum oil. The sample may be that obtained by sampler 22 from the drilling mud return coming from outlet pipe 3 and received in sample receiver 24, or that obtained in any other suitable manner from the drilling mud return. It will be understood, of course, that the increment of the mud fluid from which the sample is taken will have been previously identified with the stratum represented thereby in the manner previously described. The upper end of container 32 is open so as to expose the surface of the sample of mud to the rays of a fluorescence-exciting lamp 34 positioned above container 32 and mounted in front of a reflector 35 adapted to reflect the rays emanating from lamp 34 on to the surface of sample fluid 33 and thence through a magnifying lens 36, mounted in the sight opening 37 in the side of housing 31, to the eyes of an observer. Lamp 34 may be a conventional mercury-arc lamp, adapted to emit rays within the ultra-violet portion of the spectrum and will ordinarily be provided with a screen for screening out the visible portion of the spectrum. As illustrated in the drawing, a screen 38 is provided across the mouth of reflector 35 to screen out the visible rays, and permit only the ultra-violet rays emitted from the lamp to strike the surface of the sample for reflection therefrom.

An ordinary visible ray lamp 39, mounted in front of a reflector 40, is positioned in housing 31 and is adapted to emit ordinary visible light rays for reflection from the surface of the sample through lens 36 and sight opening 37 to the eyes of the observer. Both lamps 34 and 39 are conventionally connected by wire leads to a suitable source of electric current, not shown, and are provided with the usual switches or buttons, 41 and 42, respectively, to connect either or both lamps, in order to control application of either or both rays on the field viewed through lens 36 and sight opening 37. A pipe 43 fitted with a valve 44 is arranged to permit addition of suitable viscosity-reducing and emulsion-breaking materials to the sample of fluid in container 32.

To detect the presence of crude petroleum oil in the sample 33 of drilling mud, the sample is placed in container 32 and where necessary, the sample is mixed through pipe 43 with a very small quantity of one or the other of the above-named chemically-acting viscosity reducing agents or emulsion breaking chemicals. The mixture may be warmed in some cases to aid the action of the chemicals in freeing the minute particles or globules of oil from viscous mud and to bring the oil to the surface of the sample, since the oil will, of course, be of lighter specific gravity than the mud. In some cases, no chemical agent may be needed, if there is sufficient oil in the sample to be present on the surface thereof. Or only warming of the sample may be necessary to free the oil and bring it to the surface.

The ultra-violet lamp 34 is switched on by means of switch 41 and the ultra-violet rays directed against the surface of the sample, and if any oleaginous matter is present on the surface of the sample, this matter will become fluorescent and the invisible ultra-violet rays will be changed thereby to visible rays which will be reflected from the surface of the sample through lens 36 to the eye of the observer. The oleaginous matter will thus become visible by fluorescence to the observer.

By means of the magnification afforded by lens 36, the observer can then fix his view upon a portion of the object field and note the relative spatial position therein of the fluorescing particles. Keeping his gaze on these particular particles, he now switches on the daylight lamp 39 without switching off the ultra-violet lamp 34. Immediately, if all of the oleaginous particles are crude petroleum oil, they will fade from view, the fluorescence-exciting effect of the ultra-violet rays being screened out or absorbed by the visible rays from lamp 39. This will immediately indicate to the observer that all the oleaginous particles are crude petroleum oil and the presence of such oil in the mud fluid is thus definitely determined.

On the other hand, if upon switching on of the visible ray lamp 39, none of the particles in the part of the object field upon which the observer has fixed his attention fade from view but merely change their appearance from fluorescent to black, or take on the appearance of dark specks, the observer will be apprised immediately that the oleaginous particles in the mud fluid are not crude petroleum oil but are merely some extraneous substance, probably tool joint grease or the like. Again, if some of the fluorescent specks fade from view under the rays of the visible ray lamp, while others become visible as dark specks, this will be an indication that both crude petroleum oil and some other extraneous oleaginous substances are present in the mud fluid. This, of course, will serve to detect the presence of crude petroleum oil in the mud, despite the presence of other oleaginous substances.

It is preferable to keep the sample exposed to the ultra-violet rays when the visible rays are switched on, as the change in the particles from fluorescence to non-fluorescence or invisibility to visibility, as the case may be, is very marked to the observer who keeps his attention fixed on particular particles in the field of the instrument. However, satisfactory results may be obtained by first examining the sample under the ultra-violet rays, then switching these off and then turning on the visible ray lamp.

This method of oil detection may be performed intermittently on separate samples of the mud fluid, or it may be performed continuously, by flowing a continuous sample of the mud stream through the inspection apparatus at a sufficiently slow rate so that exposure successively to the ultra-violet and visible rays may be effected while the observer keeps his attention fixed upon particular particles as they pass through the object field.

In accordance with this oil detection method, therefore, the drilling mud return from an oil well, is subjected to a fluorescence-exciting ray to render the crude petroleum oil in the field as viewed by the observer, visible by fluorescence; by, however, subjecting the same field to a visible light ray the presence of the oil in the field can be checked, because the crude petroleum oil show will then fade out, while greases will stand out as dark spots. This checking can be accomplished by subjecting the same field to a visible light ray while subject to the fluorescence-exciting ray or by subjecting the same to a visible light ray in the absence of the fluorescence-exciting ray. This checking may be carried out still more completely after subjecting the return to a fluorescence-exciting ray, by successively subjecting the same field to a visible ray, while subject to the fluorescence-exciting ray, and subjecting the same field to the visible light ray in the absence of the fluorescence-exciting ray. By treating the return with a small percentage of a chemically-acting viscosity reducing agent before subjecting the treated return to a fluorescence-exciting ray, not only is the viscosity of the return in the field reduced so as to render the oil more readily visible, but the dilution of the return in the field will be less than when using water, so as to include the maximum amount of oil, which may be present in that field.

Another embodiment of the method in accordance with this invention for analysis of the mud for detecting the presence of crude petroleum oil in the drilling mud, is by employing a centrifuge and subjecting small samples of the drilling mud return to centrifugal force which will cause a separation of the oil from the mud whereby stratification will occur, the oil appearing as a layer on top of the heavier mud. Subjecting the drilling fluid to centrifuging will cause modification of the status of the occluded crude petroleum oil in the drilling fluid to render the oil available for testing. This method is also very sensitive, as little as one part of oil in 20,000 parts of mud being detectable in this manner.

An apparatus suitable for practicing this embodiment is illustrated in Figs. 4 and 5. This apparatus comprises a cylindrical bottle 45, preferably of glass, which is provided with an elongated tubular neck 46, the bore of which is generally of capillary size. A filler tube 47 having a larger bore than neck 46 extends into the bottle at one side of neck 46. The bottle 45 is conveniently of 100 c. c. capacity and the neck 46 is provided with graduated scale 48, the lowermost one of the graduations indicating a level of 100 c. c. The remaining graduations are arranged to read fractions of 1 c. c. A magnifying glass, not shown, may be suitably attached to the neck 46 to permit of more accurate reading of scale 48. Fig. 5 shows a conventional form of hand driven centrifuge 49, which may, of course, be power driven and of any other usual form or construction. Two of the bottles 45 are ordinarily placed in opposite ends of the rotor of the centrifuge to balance the centrifuge during rotation in the conventional manner.

This apparatus is used in the following manner: A sample of the drilling mud return is taken, as from sample receiver 24, and because of the ordinarily viscous character of the mud which might make separation of any oil difficult, a few drops of a solution of one or more of the above-mentioned chemically acting viscosity reducing agents with or without one of the emulsion breaking chemicals, may be thoroughly mixed with the mud samples. Enough of the sample is then introduced into bottle 45 through filler tube 47 to fill the bottle to the 100 c. c. mark. Clear water is then poured into the neck 46 until it is filled to the top mark. Duplicate samples are ordinarily prepared in this manner to provide a check of the results and to balance the centrifuge. The centrifuge is then rotated at a suitable speed for a suitable length of time to cause separation of the oil from the mud. Centrifuging for three minutes at about 1600 R. P. M. is found to be a suitable centrifuge rate in most cases.

When oil is present, it will separate from the mud and will stratify on the surface of the clear water in the capillary bore of neck 46. The volume of oil so separated is then read from the graduations, a magnifying glass being used, for greater accuracy in reading. By this method, employing the centrifuge and centrifuge bottles having a capillary neck, the detection of oil is found to be very sensitive, as little as one part of oil in 20,000 parts of mud being readily detectable. There is therefore provided means for not only ascertaining the presence, but also the volume of oil carried by the drilling mud. This method is also relatively quantitative. The percentage of oil found in the mud being measurable, samples from different strata provide a comparative check of the amounts of oil in these strata.

In still another modification embodiment of the centrifuge method, successive one hundred c. c. samples of the mud are taken from sample receiver 24 and the depths of the strata corresponding therto noted. The samples are each mixed with 20 c. c. of a suitable colorless solvent such as benzol, toluol, ether, or the like. The mixtures are shaken, centrifuged and the extract portions decanted into one-ounce medicine bottles and arranged in the order taken from the drill mud returns. If no oil is present, the extract portions will be substantially colorless, if oil is present, the extract portion darkens to an extent which is in proportion to the percentage of oil in the mud. By comparing the color of the extract portions, the appearance of oil in the mud can be detected, and since the samples are arranged in the order of their taking and since the depths of the strata from which they came has been determined in the manner previously described and their respective depths noted, it will be seen that this modification will also enable the detection of oil-bearing strata and their location as to depth in the well. By colorimetric comparison of the degree of discoloration of the separated oil extract against suitable standard colors, this modification may also be employed to provide a quantitative analysis of the oil in the mud.

By the various methods described above, it will be seen that the status of any oil in the drilling mud returns from the top of the well is modified and the mud returns then analyzed for the presence of oil.

From the foregoing description, it will be evident that this invention provides a novel method for continuously detecting oil in the drilling mud returns from a well during drilling and for locating the position of the oil-bearing strata in the well during the drilling operation.

What I claim and desire to secure by Letters Patent is:

1. The method of detecting minute and normally invisible quantities of crude petroleum oil in the drilling mud return from an oil well, comprising, treating the return with a small percentage of a chemically acting viscosity-reducing agent, and making an analysis of the treated return by means adapted to determine the presence of oil.

2. The method of detecing crude petroleum oil which has become dilutedly occluded in the rising column of the circulating mud-laden fluid employed in the drilling of an oil well by the drilling of a stratum while the fluid column is maintained at a head exceeding the head of the stratum, comprising, causing modification of the status of the occluded crude petroleum oil in successive portions of the drilling fluid return from the top of the well, as the drilling proceeds, adapted to render the oil available for testing, and testing the successive portions by means adapted to determine the presence of crude petroleum oil.

3. A method of locating oil strata penetrated by a bit where drilling mud is circulated in the rotary method of drilling, comprising the steps of subjecting mud from the well bore to analysis by means adapted to ascertain the presence and volume of oil carried by the drilling mud, and ascertaining the location of the formation from which the indication of oil entered the mud by determining the rate at which the circulation of the mud occurred.

4. A method of locating oil bearing strata penetrated by the bit where drilling mud is circulated in the rotary method of drilling, comprising the steps of subjecting mud from the well bore to analysis by means adapted to ascertain the presence and volume of oil carried by the drilling mud, and determining the location of the formation from which the indication of oil entered the mud, by determining the rate of circulation of the mud, and the rate of penetration of the bit so as to account for the time interval required for the mud to reach the surface.

5. A method of locating oil bearing strata penetrated by the bit where drilling mud is circulated in the rotary method of drilling, comprising the steps of subjecting the mud from the well bore to analysis by means adapted to ascertain the presence and volume of oil carried by the drilling mud, determining the rate of circulation of mud at the time the examination is being made, by considering the rate of pumpage, and ascertaining therefrom the depth of the formation from which the mud acquired the indications observed.

6. The method of detecting the presence of crude petroleum oil in the strata of an oil well while being drilled by the employment of a circulating comparatively viscuous mud-laden drilling fluid, comprising, causing drilling fluid to flow upwardly in the well at a rate which is large compared to the rate of penetration of the oil stratum being drilled and while the fluid column is maintained at a head exceeding the head of said stratum, whereby any oil from the core drilled from the stratum is dilutedly dispersed in minute and normally unobservable quantities in successive increments of the drilling fluid returns at the top of the well, and making an analysis of successive increments of the return by means adapted to determine the presence of such normally unobservable oil in such increments.

JOHN T. HAYWARD.